United States Patent
Kim et al.

(10) Patent No.: US 11,314,951 B2
(45) Date of Patent: Apr. 26, 2022

(54) ELECTRONIC DEVICE FOR PERFORMING TRANSLATION BY SHARING CONTEXT OF UTTERANCE AND OPERATION METHOD THEREFOR

(71) Applicant: SAMSUNG ELECTRONICS CO., LTD., Suwon-si (KR)

(72) Inventors: Sang-ha Kim, Seoul (KR); Eun-kyoung Kim, Suwon-si (KR); Ji-sang Yu, Seoul (KR); Jong-youb Ryu, Hwaseong-si (KR); Jae-Won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 417 days.

(21) Appl. No.: 16/463,959

(22) PCT Filed: Jun. 23, 2017

(86) PCT No.: PCT/KR2017/006627
§ 371 (c)(1),
(2) Date: May 24, 2019

(87) PCT Pub. No.: WO2018/097439
PCT Pub. Date: May 31, 2018

(65) Prior Publication Data
US 2020/0387676 A1   Dec. 10, 2020

(30) Foreign Application Priority Data

Nov. 28, 2016 (KR) .......................... 10-2016-0159416
Apr. 14, 2017 (KR) .......................... 10-2017-0048534

(51) Int. Cl.
*G06F 40/58* (2020.01)
*G10L 15/00* (2013.01)
*G10L 15/16* (2006.01)

(52) U.S. Cl.
CPC ............ *G06F 40/58* (2020.01); *G10L 15/005* (2013.01); *G10L 15/16* (2013.01)

(58) Field of Classification Search
CPC .......... G06F 40/58; G06F 40/45; G06F 16/00; G10L 15/005; G10L 15/16
USPC ......................................................... 704/2
See application file for complete search history.

(56) References Cited

U.S. PATENT DOCUMENTS

| 9,058,322 B2 | 6/2015 | Kwon et al. |
| 2006/0009963 A1 | 1/2006 | Gaussier et al. |
| 2013/0297285 A1 | 11/2013 | Kwon et al. |
| 2014/0229158 A1 | 8/2014 | Zweig et al. |
| 2015/0006157 A1 | 1/2015 | Andrade Silva et al. |

OTHER PUBLICATIONS

Bahdanau et al., "Neural Machine Translation by Jointly Learning to Align and Translate", May 19, 2016, pp. 1-15, 15 pages total, Cited in ISA Communication dated Sep. 29, 2017 in App. No. PCT/KR2017/006627.

(Continued)

*Primary Examiner* — Thierry L Pham
(74) *Attorney, Agent, or Firm* — Sughrue Mion, PLLC

(57) ABSTRACT

Provided is an artificial intelligence (AI) system which simulates the functions of a human brain, such as recognition, judgement, etc., by using a machine learning algorithm, such as deep learning, and applications thereof.

13 Claims, 10 Drawing Sheets

(56) References Cited

OTHER PUBLICATIONS

Kwon et al., "Enhancing Performance of Bilingual Lexicon Extraction through Refinement of Pivot-context Vectors", vol. 41, No. 7, Jul. 2014, pp. 492-500, 9 pages total, English abstract; Cited in ISA Communication dated Sep. 29, 2017 in App. No. PCT/KR2017/006627.
Serban et al., "Building End-To-End Dialogue Systems Using Generative Hierarchical Neural Network Models", Nov. 25, 2015, 8 pages total.
Bahdanau et al., "End-to-End Attention-Based Large Vocabulary Speech Recognition", Aug. 18, 2015, 8 pages total.
Wang et al., "Larger-Context Language Modelling With Recurrent Neural Network", Nov. 11, 2015, pp. 1-13, 13 pages total.
Cho et al., "Learning Phrase Representations using RNN Encoder-Decoder for Statistical Machine Translation", Sep. 3, 2014, 15 pages total.
Taewoongum, "T-Robotics: Nearly everything in Deep Learning that is easy to read", May 22, 2015, 9 pages total, http://t-robotics.blogspot.kr/2015/05/deep-learning.html#.V56oGNKLQfl.
Mazur, "A Step by Step Backpropagation Example", Mar. 17, 2015, 8 pages total, http://mattmazur.com/2015/03/17/a-step-by-step-backpropagation-example/.
Karpathy, "The Unreasonable Effectiveness of Recurrent Neural Networks", May 21, 2015, 30 pages total, http://karpathy.github.io/2015/05/21/mn-effectiveness/.
Colah, "Deep Learning, NLP, and Representations", Jul. 7, 2014, 11 pages total, http://colah.github.io/posts/2014-07-NLP-RNNs-Representations/.
Communication dated Sep. 29, 2017 issued by the International Searching Authority in counterpart Application No. PCT/KR2017/006627 (PCT/ISA/220, PCT/ISA/210, and PCT/ISA/237).
Cho, "Introduction to Neural Machine Translation with GPUs (part 3)", Jul. 2015, 12 pages total, XP055641843.
Cho, "Introduction to Neural Machine Translation with GPUs (Part 2)", Jun. 2015, 11 pages total, XP055641842.
Dong et al., "Multi-Task Learning for Multiply language Translation", Jul. 2015, pp. 1723-1732, 10 pages total, XP055588477.
Sennrich, "Neural Machine Translation", Sep. 15, 2016, 99 pages total, XP055641837.
Firat et al., "Multi-Way, Multilingual Neural Machine Translation with a Shared Attention Mechanism", Jan. 6, 2016, 10 pages total, XP080960573.
Communication dated Nov. 20, 2019 issued by the European Patent Office in Counterpart European Application No. 17873361.4.

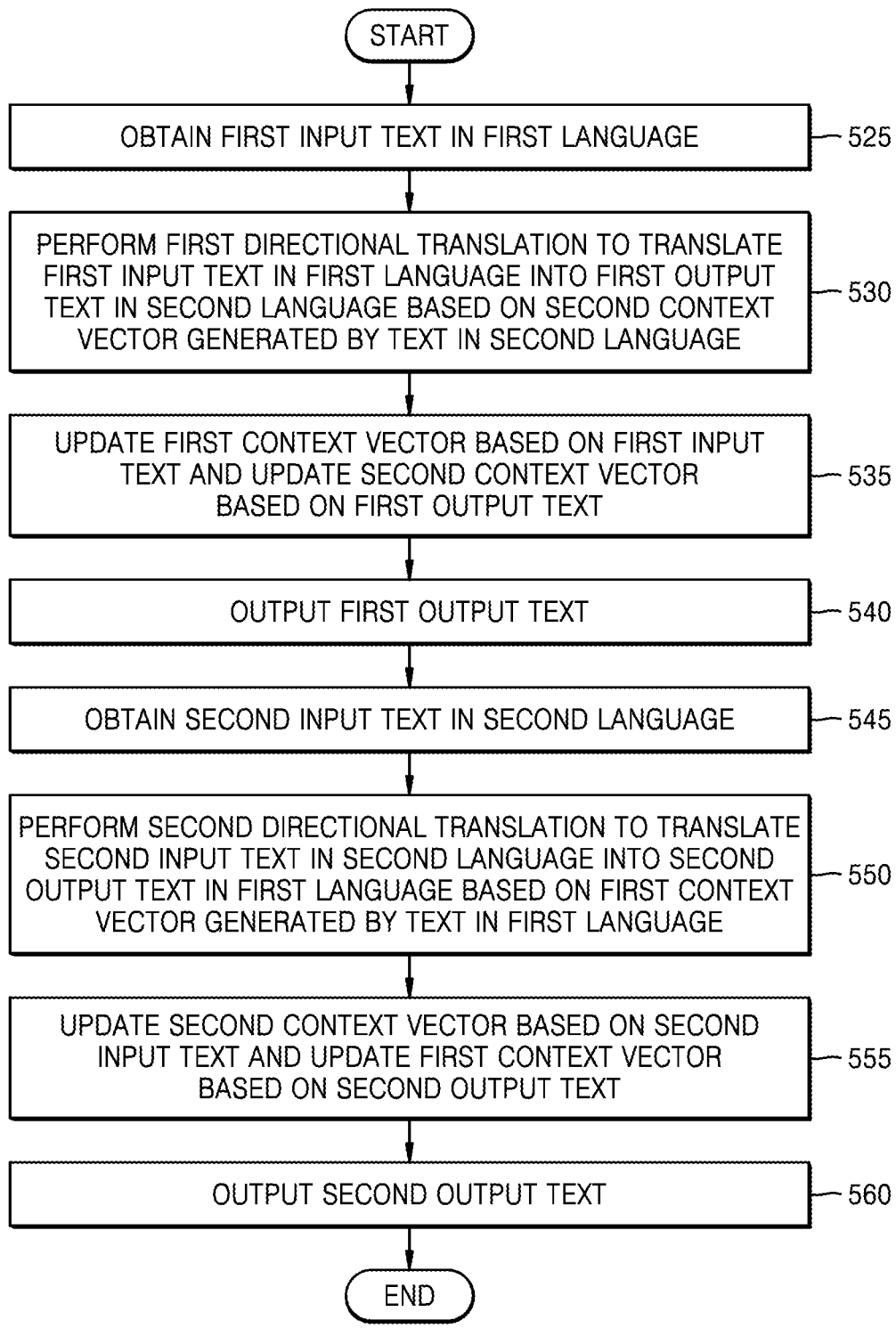

ELECTRONIC DEVICE FOR PERFORMING TRANSLATION BY SHARING CONTEXT OF UTTERANCE AND OPERATION METHOD THEREFOR

TECHNICAL FIELD

The disclosure relates to a bi-directional electronic device and an operation method thereof, and more particularly, to a bi-directional electronic device for performing bi-directional translation by sharing information on a context of utterances in each language and an operation method thereof.

BACKGROUND ART

An artificial intelligence (AI) system is a computer system that implements human-level intelligence and allows a machine to learn by itself, judge, and become smarter unlike existing rule-based smart systems. The more the AI system is used, the more a recognition rate improves and a user's preference is more accurately understood. Thus, existing rule-based smart systems are gradually being replaced by deep learning-based AI systems.

AI technology consists of machine learning (deep learning) and element technologies that utilize the machine learning.

Machine learning is an algorithm-based technology that self-classifies/learns characteristics of input data. Element technology is a technology that simulates functions of the human brain such as recognition and judgement by using machine learning algorithms such as deep learning, and consists of technical fields such as linguistic understanding, visual understanding, inference/prediction, knowledge representation, and motion control.

The AI technology may be applied to various fields as follows. Linguistic understanding is a technique of recognizing, applying, and processing human language/characters, including natural language processing, machine translation, dialogue system, query response, speech recognition/synthesis, and the like. Visual understanding is a technique to recognize and process objects as performed in human vision, including object recognition, object tracking, image search, human recognition, scene understanding, spatial understanding, image enhancement, and the like. Inference/prediction is a technique of judging, logically inferring and predicting information, including knowledge/probability-based inference, optimization prediction, preference-based planning, recommendation, and the like. Knowledge representation is a technique of automatically processing human experience information into knowledge data, including knowledge building (data generation/classification), knowledge management (data utilization), and the like. Motion control is a technique of controlling autonomous travel of a vehicle and a motion of a robot, including movement control (navigation, collision-avoidance, and traveling), operation control (behavior control), and the like.

Deep learning may also be applied to bi-directional translation, and particularly, neural machine translation (NMT) is currently being developed and in progress. Unlike conventional statistical machine translation (SMT) that performs phrase-based translation, NMT performs translation by considering the entire sentence. As a computer repeatedly learns an optimal result among translation results of a sentence, a natural translation result may be obtained.

DESCRIPTION OF EMBODIMENTS

Technical Problem

Provided is a device of performing bi-directional translation using a context vector of each language including information related to a context of a conversation in an environment where the conversation is made by a plurality of languages, and an operation method thereof.

Solution to Problem

According to an aspect of the disclosure, a method of operating an electronic device configured to translate an uttered language includes: obtaining a first input text in a first language; performing first directional translation to translate the first input text into a first output text in a second language based on a context vector generated by a text obtained before the first input text is obtained; updating the context vector based on the first input text and the first output text; and outputting the first output text.

BRIEF DESCRIPTION OF DRAWINGS

FIG. 5B is a flowchart of a method of performing, by an electronic device, bi-directional translation, according to an embodiment.

BEST MODE

Figure 1:
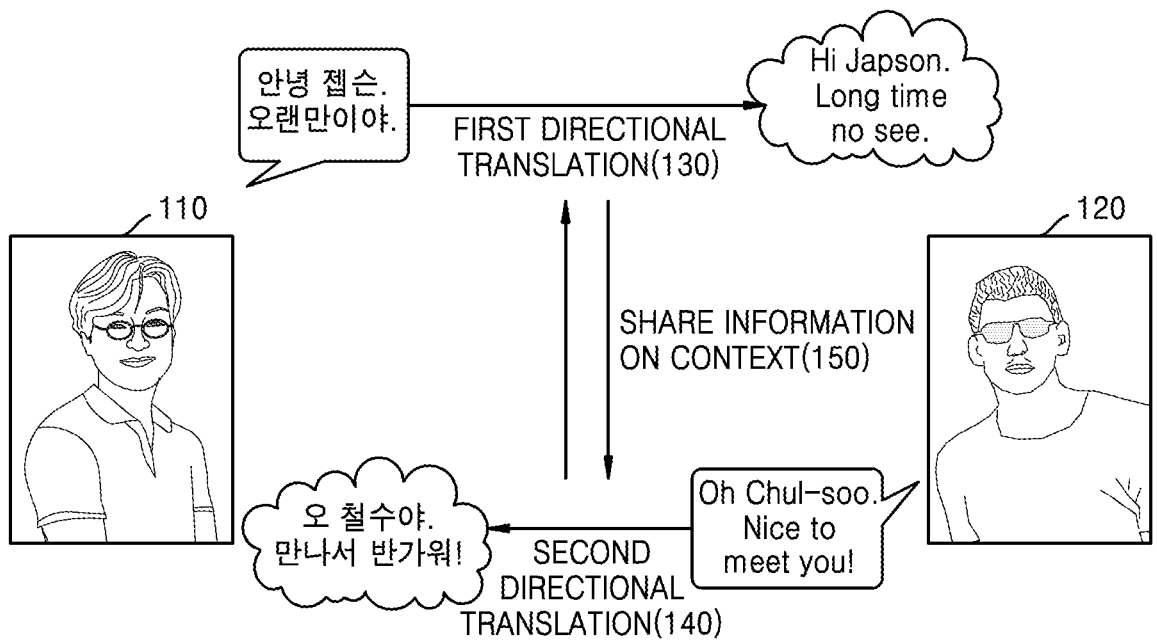
FIG. 1 is a diagram illustrating an example of performing bi-directional translation according to an embodiment.

A method of operating an electronic device configured to translate an uttered language according to an embodiment includes: obtaining a first input text in a first language; performing first directional translation to translate the first input text into a first output text in a second language based on a context vector generated by a text obtained before the first input text is obtained; updating the context vector based on the first input text and the first output text; and outputting the first output text.

An electronic device according to an embodiment may include: an obtainer configured to obtain a first input text in a first language; at least one processor configured to perform first directional translation to translate the first input text into a first output text in a second language based on a context vector generated by a text obtained before the first input text is obtained and configured to update the context vector based on the first input text and the first output text; and an output unit configured to output the first output text.

In the electronic device according to an embodiment, the context vector may include a first context vector generated based on a text in the first language and a second context vector generated based on a text in the second language, and the at least one processor may be configured to perform the first directional translation based on the second context vector, update the first context vector based on the first input text, and update the second context vector based on the first output text.

In the electronic device according to an embodiment, the at least one processor may be configured to generate the first context vector based on at least one of an input text in the first language obtained before the first input text is obtained and an output text in the first language output before the first input text is obtained, and generate the second context vector based on at least one of an input text in the second language obtained before the first input text is obtained and an output text in the second language output before the first input text is obtained.

In the electronic device according to an embodiment, while performing the first directional translation, the at least one processor may be configured to sequentially generate a plurality of first hidden vectors based on a plurality of first input vectors corresponding to a plurality of words included in the first input text in the first language, determine respective weights of the plurality of first hidden vectors, determine a plurality of first output vectors by using the respective weights of the plurality of first hidden vectors, the plurality of first hidden vectors, and the second context vector, and determine a plurality of words to be included in the first output text based on the plurality of first output vectors.

In the electronic device according to an embodiment, the at least one processor may be configured to initialize the first context vector and the second context vector upon determining that a topic of the uttered language is changed.

In the electronic device according to an embodiment, the at least one processor may be configured to initialize the first context vector and the second context vector when a degree of association between a last generated vector among the plurality of first hidden vectors and the first context vector is less than a preset reference value or when a degree of association between a last generated vector among the plurality of second hidden vectors and the second context vector is less than a preset reference value.

In the electronic device according to an embodiment, the context vector may further include a third context vector generated based on a text in a third language, the obtainer may be configured to further obtain a third input text in the third language, the at least one processor may be configured to perform third directional translation to translate the third input text in the third language into a third output text in the first language based on the updated first context vector, and update the updated first context vector and the third context vector respectively based on the third input text and the third output text, and the output unit may output the third output text.

A computer-readable recording medium having recorded thereon a program for executing a method of translating an uttered language according to an embodiment includes: obtaining a first input text in a first language; performing first directional translation to translate the first input text into a first output text in a second language based on a context vector generated by a text obtained before the first input text is obtained; updating the context vector based on the first input text and the first output text; and outputting the first output text.

MODE OF DISCLOSURE

The disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. In the drawings, parts unrelated to the descriptions are omitted for clear description of the disclosure. Throughout the specification, like reference numerals denote like elements.

Although the terms used throughout the specification may be used herein to describe various components, these components should not be limited by these terms. These terms are only used to distinguish one component from another.

It will be understood that, although the expressions "first" or "second" may be used in various embodiments of the disclosure to describe various components, these components are not limited by these expressions. For example, these expressions do not limit the order and/or importance of the components. The expressions may be used to distinguish one component from another. For example, both a first user device and a second user device are user devices different from each other.

For example, a first component may be termed a second component, and similarly, the second component may be termed the first component without departing from the teachings of this disclosure.

Throughout the specification, it will also be understood that when a portion is referred to as being "connected to" another portion, it can be "directly connected to" the other portion, or it can be "electrically connected to" the other portion with an intervening element interposed therebetween. In addition, when a portion is "connected to" another portion, the portion may be in a state where data communication is enabled with the other portion by sending/receiving signals.

Some embodiments may be described in terms of functional block components and various processing steps. Some or all of functional blocks may be realized by any number of hardware and/or software components configured to perform the specified functions. For example, the functional blocks of the disclosure may be implemented by one or more microprocessors or may be implemented by circuit components for predetermined functions. In addition, for example, the functional blocks of the disclosure may be implemented with any programming or various scripting languages. The functional blocks may be implemented in algorithms that are executed on one or more processors. Furthermore, the disclosure could employ any number of techniques according to the related art for electronics configuration, signal processing, and/or data processing. The terms "module", "element", or the like may be broadly used and are not limited to mechanical or physical embodiments.

Furthermore, connecting lines or connectors between elements shown in drawings are intended to represent exemplary functional connection and/or physical or logical connection between the elements. It should be noted that many alternative or additional functional connections, physical connections, or logical connections may be present in a practical device.

In embodiments of the disclosure, the term "speaker" refers to a person who gives utterance, and the term "listener" refers to a person who listen the utterance. In a conversation made by a plurality of people, the speaker and the listener change every moment, and thus there may be confusion in distinguishing each person from another. Therefore, according to the disclosure, each person may be distinguished based on a langue used thereby. For example, one person using a first language may be distinguished as a "first speaker", and another person using a second language may be distinguished as a "second speaker".

In embodiments of the disclosure, the term "text" may be data used for the purpose of transferring a meaning to a counterpart. The "text" may include data in a natural language form such as characters, symbols, words, phrases, sentences, diagrams, and charts, data in an array of characters of an artificial language, or voice data. For example, the "text" may refer to utterance expressed in characters or speech signals.

In embodiments of the disclosure, the term "target language" refers to a language into which a translation is performed. For example, when a text in a first language is translated into a third in a second language, the target language may be the second language.

In embodiments of the disclosure, the term "input vector" refers to information of each of a plurality of words included in an input text expressed as a m-dimensional real number vector (where m is a natural number, and the term "context vector" refers to information on a context expressed as a n-dimensional real number vector (where n is a natural number). The input vector and the context vector may be word embedding vectors corresponding to a certain word.

In addition, in embodiments of the disclosure, the term "hidden vector" as used herein refers to a k-dimensional (where k is a natural number) vector indicating each of pieces of temporary information sequentially changing in accordance with a plurality of input vectors and used to update the context vector based on the input vector and to translate the input text into the output text.

Hereinafter, the disclosure will be described in detail with reference to the accompanying drawings.

FIG. 1 is a diagram illustrating an example of performing a bi-directional translation according to an embodiment.

In FIG. 1, a first speaker 110 and a second speaker 120 who use different languages are illustrated. For communication between the first speaker 110 and the second speaker 120, first directional translation 130 to translate contents uttered in a first language used by the first speaker 110 into a second language used by the second speaker 120 and second directional translation 140 to translate contents uttered by the second speaker 120 in the second language into the first language used by the first speaker 110 are required. The first speaker 110 and the second speaker 120 may use an electronic device that performs functions of the first directional translation 130 and the second directional translation 140.

For example, when the first speaker 110 utters "안녕 젭슨. 오랜만이야." in Korean. The electronic device according to an embodiment may output a translated text "Hi Japson. Long time no see." in English to the second speaker 120 by performing the first directional translation 130. Subsequently, when the second speaker 120 utters "Oh Chul-soo. Nice to meet you!" in English, the electronic device according to an embodiment may output a translated text " 오 철수야. 만나서 반가워!" in Korean to the first speaker 110 by performing the second directional translation 140.

When the first directional translation 130 and the second directional translation 140 are independently performed, translation is performed without considering utterance of a counterpart, and thus incorrect translation results different from the speaker's intentions may often be obtained. Therefore, the electronic device according to an embodiment may share information on context of each language obtained while performing the first directional translation 130 and information on a context of each language obtained while performing the second directional translation 140 and use shared information 150 translation in each direction as shown in FIG. 1. By sharing the information on the context, the electronic device according to an embodiment may perform translation closer to the intentions of the speakers.

Figure 2A:
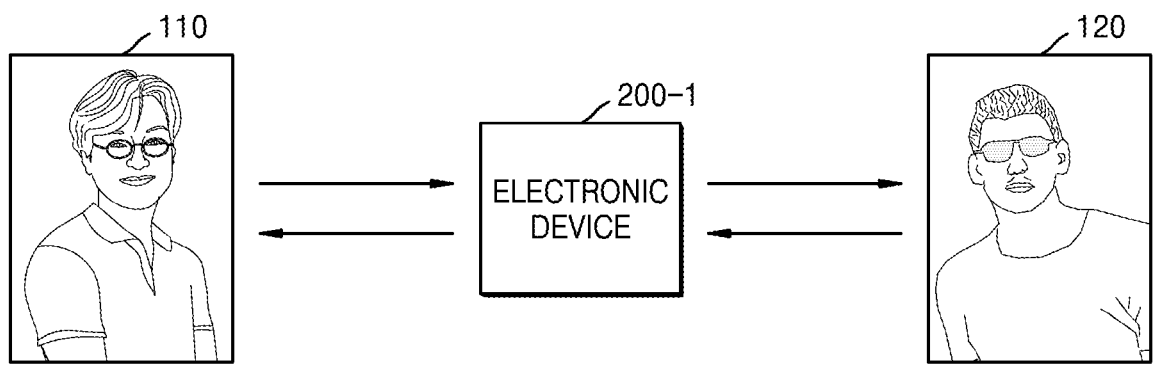
FIGS. 2A to 2C are diagrams illustrating bi-directional translation systems according to an embodiment.
Figure 2B:
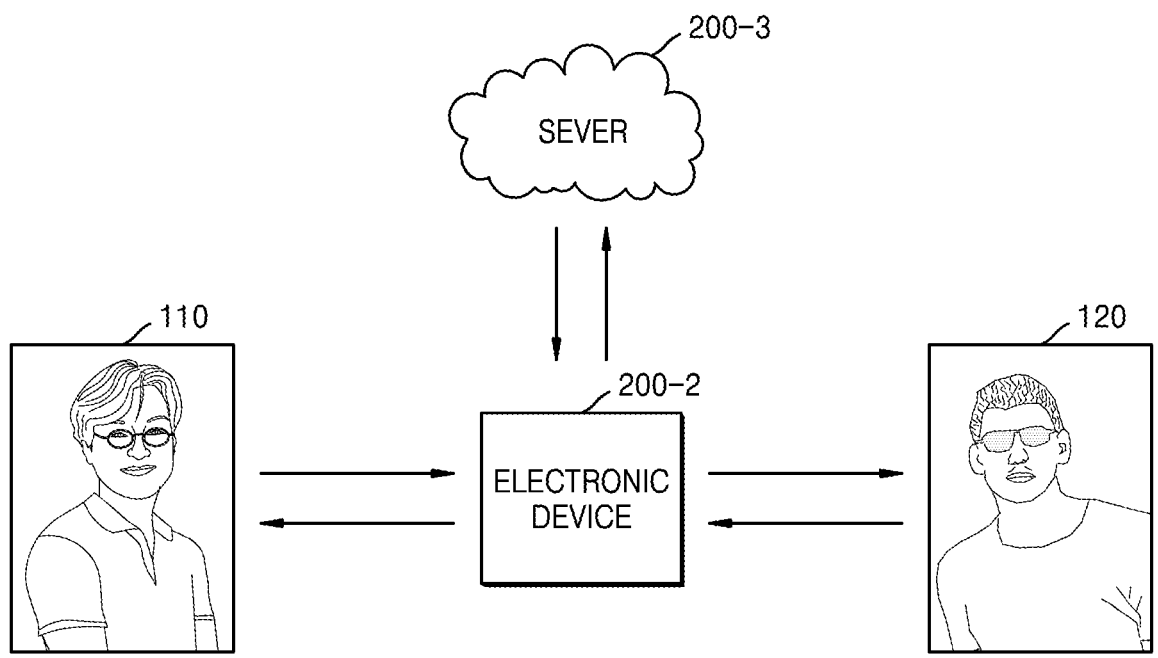
Figure 2C:
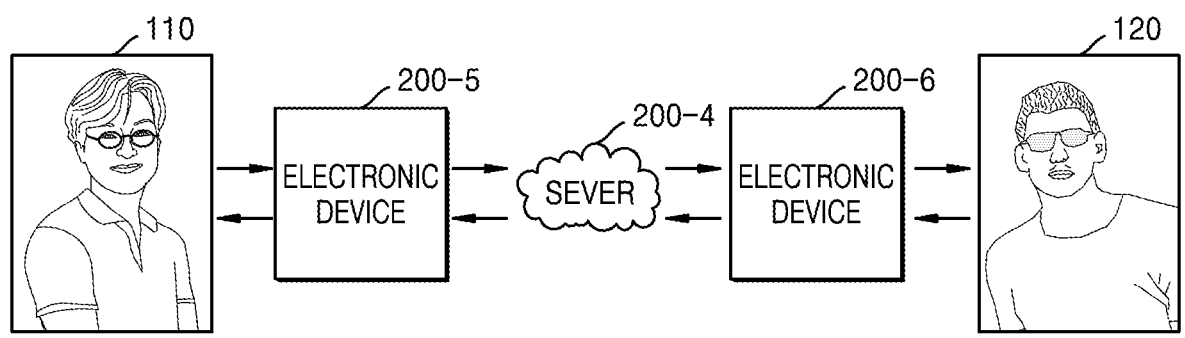

FIGS. 2A to 2C are diagrams illustrating bi-directional translation systems according to an embodiment.

Although two speakers are shown in FIGS. 2A to 2C, the number of speakers is not limited thereto, and the examples illustrated in FIGS. 2A to 2C may also be applied to a case in which a speaker speaks alone or three or more speakers may participate in a conversation.

According to an embodiment, electronic devices 200-1, 200-2, 200-5, and 200-6 illustrated in FIGS. 2A to 2C may be implemented using various devices or servers such as a smart phone, a tablet PC, a laptop computer, a wearable device, a desktop computer, an E-book terminal, a terminal for digital broadcasting, a personal digital assistant (PDA), a portable multimedia player (PMP), a navigator, and an MP3 player, without being limited thereto.

FIG. 2A is a diagram illustrating a translation system including an electronic device 200-1 according to an embodiment.

According to an embodiment, when the first speaker 110 utters in the first language, the electronic device 200-1 may receive the utterance of the first speaker 110. The electronic device 200-1 may translate the received utterance into the second language and output the translated result to the second speaker 120.

For example, the electronic device 200-1 may be a smart phone. When the first speaker 110 utters "안녕 젭슨. 오랜만이야." in Korean toward the electronic device 200-1, the electronic device 200-1 may output "Hi Japson. Long time no see." in English by receiving the utterance and translating a received text into English. The electronic device 200-1 may output a translated text in the form of characters on a screen or in the form of speech signals.

According to an embodiment, when the second speaker 120 utters in the second language, the electronic device 200-1 may also perform translation in the reverse direction by receiving an utterance of the second speaker 120, translating the received utterance into the first language, and outputting the translation to the first speaker 110.

FIG. 2B is a diagram illustrating a translation system including an electronic device 200-2 and a server 200-3 according to an embodiment.

The electronic device 200-2 may be connected to the server 200-3 via a wired or wireless network and may exchange data with each other.

According to an embodiment, when the first speaker 110 utters in the first language, the electronic device 200-2 may receive the utterance of the first speaker 110, translate the received utterance into a second language, and output the translated result to the second speaker 120. In this regard, information required for the translation may be received from the server 200-3.

Alternatively, when the first speaker 110 utters in the first language, the electronic device 200-2 may receive the utterance and transmit the received utterance to the server 200-3, and the server 200-3 may translate the utterance into the second language and transmit the translated result back to the electronic device 200-2. The electronic device 200-2 may transmit the content translated into the second language to the second speaker 120.

For example, when an American speaker utters "I have two sisters.", the electronic device 200-2 may receive the uttered content and transmit the received content to the server 200-3. The server 200-3 may transmit a translated text "나는 누나 한 명과 여동생 한 명이 있어" to the electronic device 200-2.

According to an embodiment, when the second speaker 120 utters in the second language, the electronic device 200-2 may receive the utterance of the second speaker 120, translate the received utterance into the first language, and output the translated result to the first speaker 110, and may receive information required for the translation from the server 200-3.

Alternatively, when the second speaker 120 utters in the second language, the electronic device 200-2 may receive the uttered content and transmit the received content to the server 200-3, and the server 200-3 may translate the received content into the first language and transmit the translated content back to the electronic device 200-2. The electronic device 200-2 may transfer the content translated into the first language to the first speaker 110.

FIG. 2C is a diagram illustrating a translation system including a server 200-4 and a plurality of electronic devices 200-5 and 200-6 according to an embodiment.

According to an embodiment, when the first speaker 110 utters in the first language, the electronic device 200-5 may receive the uttered content and transmit the received content to the server 200-4. The server 200-4 may translate the uttered content into a second language and transmit the translated content to the electronic device 200-6. The electronic device 200-6 may output the translated content to the second speaker 120.

According to an embodiment, when the second speaker 120 utters in the second language, the electronic device 200-6 may receive the uttered content and transmit the received content to the server 200-4. The server 200-4 may translate the content uttered in the second language into the first language and transmit the translated content to the electronic device 200-5. The electronic device 200-5 may output the translated content to the first speaker 110.

As shown in FIGS. 2A, 2B, and 2C, the translation systems according to various embodiments include at least one electronic device and may further include a server. Hereinafter, a bi-directional translation method performed in the "electronic device" will be described for descriptive convenience. However, some or all of operations of the electronic device to be described below may also be performed by the server and partially conducted by the plurality of electronic devices.

Figure 3:
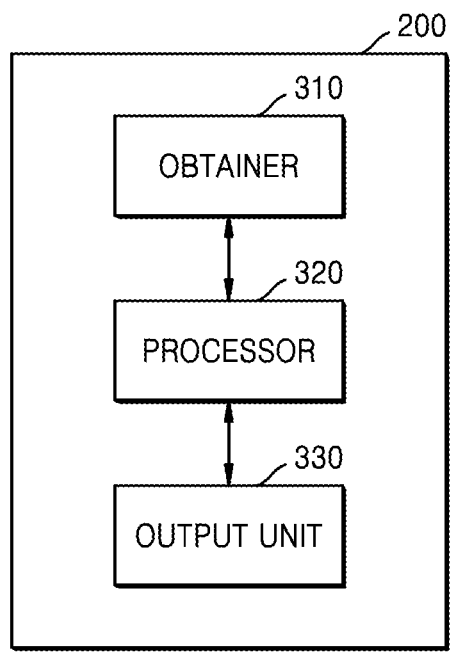
FIG. 3 is a block diagram illustrating a configuration of an electronic device according to an embodiment.

FIG. 3 is a block diagram illustrating a configuration of an electronic device according to an embodiment.

An electronic device 200 according to an embodiment may include an obtainer 310, a processor 320, and an output unit 330. However, the electronic device 200 may also be implemented using more components than those illustrated in FIG. 3. For example, the electronic device 200 according to an embodiment of the disclosure may be embedded in at least one of a home appliance, a mobile computing device, and a server or may be connected to at least one of the home appliance, the mobile computing device, and the server in a wired or wireless network.

The obtainer 310 according to an embodiment may obtain an input text of at least one language. For example, the obtainer 310 may obtain a first input text in a first language. The obtainer 310 may also obtain a second input text in a second language. Types of languages of the input texts obtained by the obtainer 310 are not particularly limited.

For example, when the first speaker 110 utters "피곤하다" in Korean that is the first language and then the second speaker 120 utters "Me, too" in English that is the second language, the obtainer 310 may convert the utterances of "피곤하다" and "Me, too" into texts processible by the processor 320 and obtain the texts.

The obtainer 310 may include a microphone to directly receive a speech of a speaker via the microphone. The obtainer 310 may convert the received speed into a text by performing speech recognition. Alternatively, the obtainer 310 may receive a text converted from a speech received by an external device, from the external device. Although FIG. 3 illustrates that the electronic device 200 includes the obtainer 310, an obtainer 310 according to another embodiment may also be embedded in a separate device and connected to the electronic device 200 via a wired or wireless network. FIG. 3 illustrates the obtainer 310 and the processor 320 as separate components for descriptive convenience. However, the embodiment is not limited thereto. The obtainer 310 according to an embodiment may be included in the processor 320, or some or all of the functions performed by the obtainer 310 may be conducted by the processor 320.

The processor 320 may perform a series of processes of translating the input text obtained by the obtainer 310 according to an embodiment.

According to an embodiment, the processor 320 may perform the first directional translation 130 to translate the first input text in the first language into the first output text in the second language based on a context vector. For example, a first input text of "피곤하다" in the first language may be translated into a first output text of "Tired" in the second language.

According to an embodiment, the processor 320 may update the context vector based on the first input text and the first output text.

According to an embodiment, the processor 320 may perform the second directional translation 140 to translate the second input text in the second language into the second output text in the first language based on the updated context vector. For example, a second input text of "Me, too" in the second language may be translated into a second output text "나도 피곤하다" in the first language.

According to an embodiment, the processor 320 may reupdate the context vector based on the second input text and the second output text.

The processor 320 according to an embodiment may operate by an artificial intelligence system based on deep learning.

Although one processor is illustrated in FIG. 3, the electronic device 200 may also include a plurality of processors.

The output unit 330 may output a result of translation performed by the processor 320. The output unit 330 may inform a user of the translation result or transmit the translation result to an external device (e.g., smart phone, smart TV, smart watch, and server). For example, the output unit 330 may include a display to output a translated text or a speaker to output a speech signal converted from the translated text.

The output unit 330 according to an embodiment may output at least one of the first output text and the second output text.

According to an embodiment, the output unit 330 may transmit the translation result to the listener by outputting a speech corresponding to at least one of the first output text and the second output text. The speech corresponding to at least one of the first output text and the second output text may be transmitted to only the listener or to both the listener and the speaker.

Alternatively, the output unit 330 may transmit the translation result to the listener by outputting characters corresponding to at least one of the first output text and the second output text. For example, the output unit 330 displays the characters corresponding to at least one of the first output text and the second output text on the display. The characters corresponding to at least one of the first output text and the second output text may be transmitted to only the listener or to both the listener and the speaker.

The method of outputting at least one of the first output text and the second output text is not limited to methods of using speeches and characters.

The block diagram of the electronic device 200 illustrated in FIG. 3 may be used to realize the electronic devices 200-1, 200-2, 200-5, and 200-6 illustrated in FIGS. 2A to 2C.

Figure 4:
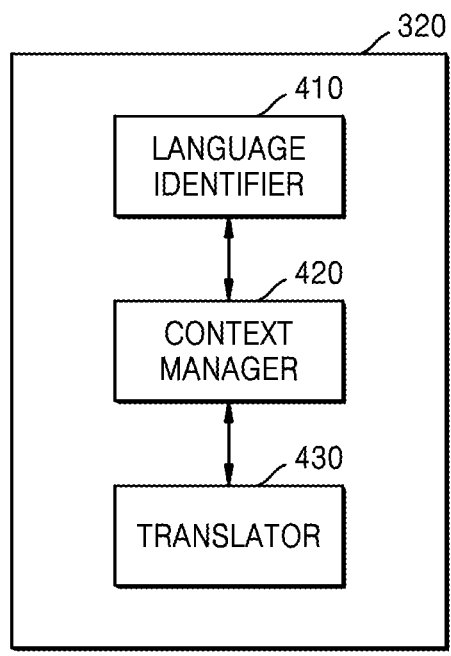
FIG. 4 is a block diagram illustrating a configuration of a processor of an electronic device, according to an embodiment.

FIG. 4 is a block diagram illustrating a configuration of a processor in an electronic device according to an embodiment.

Some or all of the blocks illustrated in FIG. 4 may be realized by hardware and/or software components configured to execute specified functions. The functions performed by the blocks illustrated in FIG. 4 may be implemented by one or more microprocessors or may be implemented by circuit components for the functions. Some or all of the blocks shown in FIG. 4 may be software modules configured with various programming or scripting languages executed by the processor 320 according to an embodiment.

The processor 320 according to an embodiment may include a language identifier 410, a context manager 420, and a translator 430.

The language identifier 410 may identify a type of a language uttered by the speaker according to an embodiment. More particularly, the language identifier 410 may identify a type of a language of an input text by analyzing the input text obtained by the obtainer 310. When the first speaker 110 utters in the first language, the language identifier 410 may identify the type of the uttered language as the first language. The uttered language may be referred to as a source language.

For example, when the obtainer 310 obtains the first input text, the language identifier 410 may identify the language type of the first input text as the first language by analyzing the first input text. When the obtainer 310 obtains the second input text, the language identifier 410 may identify the language type of the second input text as the second language by analyzing the second input text. When the obtainer 310 obtains the first input text, the language identifier 410 may identify the source language as the first language by analyzing the first input text. When the obtainer 310 obtains the second input text, the language identifier 410 may identify the source language as the second language by analyzing the second input text.

Also, the language identifier 410 may determine a language into which the uttered language is to be translated. In other words, the language identifier 410 may determine a target language based on the identified source language. For example, when the first speaker 110 utters in the first language, the language identifier 410 may determine the second language as the target language into which the utterance in the first language is to be translated.

According to an embodiment, the electronic device 200 may determine a language pair used to perform the bi-directional translation in advance. For example, the electronic device 200 may determine English and Korean as a language pair used for the bi-directional translation. In this case, when the electronic device 200 identifies English as the source language, Korean may be automatically determined as the target language into which the source language is to be translated. On the contrary, when the electronic device 200 identifies Korean as the source language, English may be automatically determined as the target language into which the source language is to be translated. According to another embodiment, the language identifier 410 may determine the target language based on information prestored in a memory (not shown). For example, the memory may store types of languages frequently selected as target languages in the case where the speaker uses the electronic device 200 and use the stored types of languages as a reference for future determination of a target language.

Alternatively, the language identifier 410 may identify the listener by using an external sensor (not shown) and determine the target language used by the identified listener. For example, the external sensor may identify the listener based on skin color, iris color, palm lines, finger print, tone, and the like of the listener and determine the target language used by the listener based on nationality and race of the listener.

Also, the language identifier 410 may determine the target language based on information input by the speaker or the listener. For example, an input unit (not shown) may receive an input of the type of language used by the listener from the speaker or the listener, and the language identifier 410 may determine the target language based on the type of the language used by the listener input by the speaker or the listener.

The context manager 420 may update the context vector based on the first input text in the first language and the first output text in the second language according to an embodiment. More particularly, the context manager 420 may update the context vector while the translator 430 translates the first input text in the first language into the first output text in the second language. Also, the context manager 420 may update the context vector while the translator 430 translates the second input text in the second language into the second output text in the first language.

In addition, upon determining that a topic of conversation uttered in one language is changed, the context manager 420 may initialize the context vector. A process of initializing the context vector performed by the context manager 420 will be described in more detail blow with reference to FIG. 8.

The translator 430 may perform the first directional translation 130 to translate the first input text in the first language into the first output text in the second language based on the context vector according to an embodiment.

Also, the translator 430 may perform the second directional translation 140 to translate the second input text in the second language into the second output text in the first language based on the context vector.

The translator 430 according to an embodiment may convert the translation direction upon receiving information that the speaker of the conversation is changed from the language identifier 410. For example, upon receiving information that the speaker is changed from the first speaker 110 to the second speaker 120 from the language identifier 410, the translator 430 may stop the first directional translation 130 and then perform the second directional translation 140.

Meanwhile, the block diagrams of the electronic device 200 and the processor 320 respectively illustrated in FIGS. 3 and 4 are block diagrams for an embodiment. Components of each block diagram may be integrated or added according to performance of the electronic device 200. That is, two or more components may be integrated into one component, or one component may be separated into two or more components. In addition, functions performed by each block are provided for descriptive convenience of the embodiments, and detailed operations or devices are not intended to limit the scope of the disclosure.

A translation engine used by the electronic device 200 to translation a conversation among a plurality of speakers is not limited to one processor 320 or one translator 430 included in the processor 320. While performing translation in different directions, a plurality of different processors or a plurality of translators may be used for respective directions.

In addition, the electronic device 200 may use an artificial intelligence (AI) system based on deep learning while performing the first directional translation 130 and the second directional translation 140 described above. For example, the electronic device 200 may use neural machine translation (NMT).

Figure 5A:
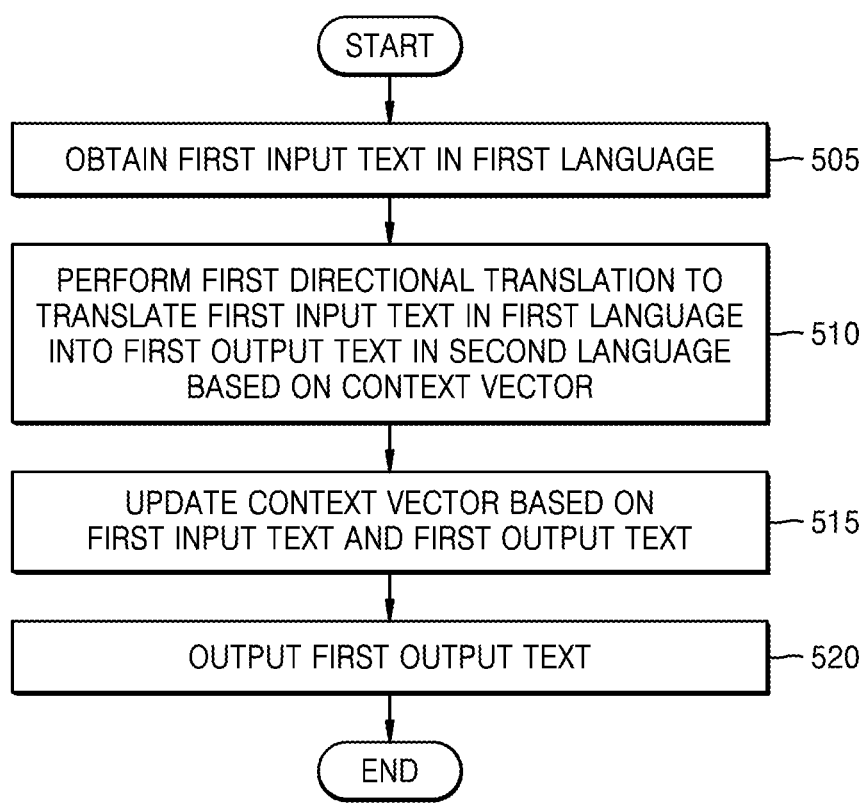
FIG. 5A is a flowchart of a method of performing first directional translation performed by an electronic device according to an embodiment of the disclosure.

FIG. 5A is a flowchart of a method of performing first directional translation by an electronic device according to an embodiment. FIG. 5B is a flowchart of a method of performing a bi-directional translation by an electronic device according to an embodiment.

Each process of the methods shown in FIGS. 5A and 5B may be performed by the components of the electronic device 200 illustrated in FIG. 3, and descriptions given above with reference to FIG. 3 will not be repeated. Although only a case in which the electronic device 200 operates is described for descriptive convenience, the following descriptions may also be applied to any case in which the server operates. Each process of the methods illustrated in FIGS. 5A and 5B may be realized using AI technology.

For better understanding, the embodiment will be described with reference to a conversation between the first speaker 110 and the second speaker 120 shown in FIG. 1.

In operation 505, the electronic device 200 may obtain the first input text in the first language. For example, as shown in FIG. 1, the electronic device 200 may obtain the first input text "안녕 젭슨. 오랜만이야." from the utterance of the first speaker 110.

In operation 510, the electronic device 200 may perform the first directional translation to translate the first input text in the first language into the first output text in the second language based on the context vector. More particularly, the electronic device 200 may perform the first directional translation to translate the first input text into the first output text in the second language based on the context vector generated based on a text obtained before the first input text is obtained. For example, the electronic device 200 may translate the first input text of "안녕 젭슨. 오랜만이야." into the first output text of "Hi Japson. Long time no see." as shown in FIG. 1.

There are various contexts in an utterance, and the content of translation may be determined according to the context. For example, an input text of "미안하지만 꺼줄 수 있어?" in Korean may be translated into either "Sorry, but could you turn off the radio?" or "Sorry, but could you put out the fire?". In this regard, when the speaker using English uttered "I like this song on radio." in a previous conversation, a correct translation of the "미안하지만 꺼줄 수 있어?" may be "Sorry, but could you turn off the radio?" based on the context. Thus, the electronic device 200 according to an embodiment may increase accuracy of translation by performing translation using context vectors to which the content of the previous conversation is reflected.

The context vector indicates information on the context as a vector corresponding to a certain position in a n-dimensional space (where n is a natural number) as described above. The context vector may be updated whenever information on the context is accumulated. Although an updated context vector is changed in a position in the n-dimensional vector space when compared with the context vector before updating, information on various contexts generated during a conversation may be accumulated therein.

According to an embodiment, the context vector may include a first context vector generated based on the text in the first language and a second context vector generated based on the text in the second language. However, the embodiment is not limited thereto, and the context vector may further include a context vector of another language (e.g., third context vector of a third language).

According to an embodiment, the electronic device 200 may generate the first context vector based on at least one of an input text in the first language obtained before the first input text is obtained and an output text in the first language output before the first input text is obtained. In addition, the electronic device 200 may generate the second context vector based on at least one of an input text in the second language obtained before the first input text is obtained and an output text in the second language output before the first input text is obtained. That is, the electronic device 200 may generate the context vector based on previous utterances of the speakers.

The second context vector may be used for the first directional translation 130 to translate the input text in the first language into the output text in the second language, and the first context vector may be used for the second directional translation 140 to translate the input text in the second language into the output text in the first language. A method of using the context vector in translation will be described in more detail below with reference to FIG. 6.

In operation 515, the electronic device 200 may update the context vector based on the first input text and the first output text.

According to an embodiment, the context vector before the speaker first utters may be in an initial state. In the initial state, the n-dimensional context vector may have a preset initial value. The electronic device 200 may update the context vector based on the obtained first input text and the first output text translated from the first input text.

According to an embodiment, when there was an utterance before the first input text is uttered, the context vector was in a state already updated by the electronic device 200 based on an input text and an output text of the previous utterance. In this case, the electronic device 200 may reupdate the context vector based on the obtained first input text and the first output text translated from the first input text.

In operation 520, the electronic device 200 may output the first output text. For example, the electronic device 200 may output the first output text of "Hi Japson. Long time no see." generated as a translation result from the first input text as illustrated in FIG. 1.

Although the method of translating in the first direction using the context vector is described with reference to FIG. 5A, the embodiment is not limited thereto, and the electronic device 200 according to an embodiment may perform a bi-directional translation.

FIG. 5B is a flowchart for describing a method of performing first directional translation and second directional translation of an electronic device according to an embodiment.

FIG. 5B is a flowchart showing a series of processes of the first directional translation from the first language into the second language and the second directional translation from the second language into the first language when the first speaker 110 utters in the first language and then the second speaker 120 utters in the second language in response thereto. Operations 525 and 540 are the same as operations 505 and 520 of FIG. 5A, and thus detailed descriptions thereof will be omitted.

In operation 525, the electronic device 200 may obtain the first input text in the first language.

In operation 530, the electronic device 200 may perform the first directional translation to translate the first input text in the first language into the first output text in the second language based on the second context vector generated by the text in the second language.

In operation 535, the electronic device 200 may update the first context vector based on the first input text and update the second context vector based on the first output text.

In operation 540, the electronic device 200 may output the first output text.

In operation 545, the electronic device 200 may obtain the second input text in the second language. For example, the electronic device 200 may obtain the second input text of "Oh Chul-soo. Nice to meet you!" from the second speaker 120.

In operation 550, the electronic device 200 may perform the second directional translation to translate the second input text in the second language into the second output text in the first language based on the first context vector generated by the text in the first language. In other words, the electronic device 200 may perform the second directional translation to translate the second input text in the second language into the second output text in the first language based on the context vector updated in operation 530. For example, the electronic device 200 may translate the second input text of "Oh Chul-soo. Nice to meet you!" into the second output text of "오 철수야. 만나서 반가워!".

In operation 555, the electronic device 200 may update the second context vector based on the second input text and update the first context vector based on the second output text. In other words, the electronic device 200 may reupdate the context vector already updated in operation 530 based on the second input text and the second output text.

In operation 560, the electronic device 200 may output the second output text. For example, the electronic device 200 may output the second output text of "오 철수야. 만나서 반가워!" generated as a result of translation from the second input text.

Figure 6:
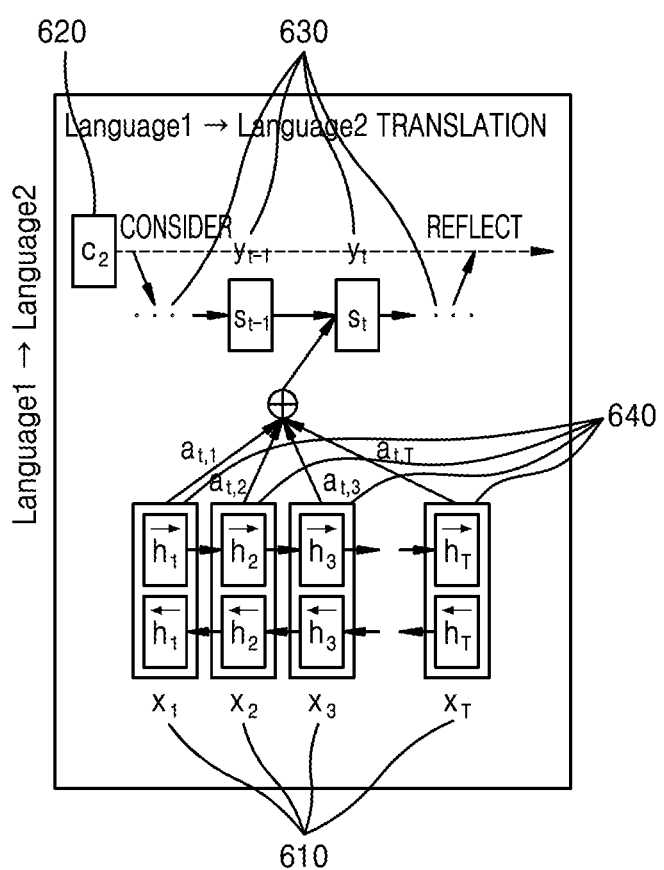
FIG. 6 is a diagram illustrating a process of performing first directional translation, according to an embodiment.

FIG. 6 is a diagram illustrating a process of performing first directional translation according to an embodiment.

According to an embodiment, the electronic device 200 may determine a plurality of first input vectors 610 corresponding to a plurality of words included in a first input text in a first language.

For example, when the electronic device 200 obtains the first input text of "안녕 철순. 오랜만이야.", the electronic device 200 may determine a plurality of first input vectors 610 including a first input vector $x_1$ corresponding to "안녕", a first input vector $x_2$ corresponding to "철순" and a first input vector $x_3$ corresponding to "오랜만이야".

According to an embodiment, the electronic device 200 may sequentially generate a plurality of first hidden vectors 640 based on the determined plurality of first input vectors 610.

For example, when a first input vector $x_t$ is m-dimensional (where m is a natural number) and a first hidden vector $h_t$ is n-dimensional, the first hidden vector may be calculated using Equation 1 below.

$$h_1 = f_1(x_1, h_{t-1}), t=1,2,\ldots T \qquad \text{Equation 1}$$

Here, t denotes an index of a plurality of words included in the first input text, and T denotes a total number of the plurality of words included in the first input text. In a computation process, the function $f_1$ may use W which may be interpreted as a parameter matrix learned (or to be learned) to modify a dimension of the first input vector $x_t$ to correspond to a dimension of the first hidden vector $h_t$. W is an n*m matrix, and the function $f_1$ may be computed using various methods.

According to an embodiment, the electronic device 200 may determine a weight of each of the plurality of first hidden vectors 640. The weight may vary according to one of a plurality of output hidden vectors $s_1, s_2, \ldots, s_K$ (where K is a natural number and a total number of the plurality of words to be included in the first output text) to be calculated and according to one of the plurality of first hidden vectors 640 $h_1, h_2, \ldots, h_T$ corresponding thereto. For example, a weight used to calculate the output hidden vector $s_3$ and corresponding to the first hidden vector $h_2$ may be determined as $a_{3,2}$.

According to an embodiment, the weight may be determined in a computation process of a $(t-1)^{th}$ output hidden vector $s_{t-1}$ and the plurality of first input hidden vectors 640 to calculate a $t^{th}$ output hidden vector $s_t$.

According to an embodiment, the electronic device 200 may calculate a vector $b_{at}$ by applying the weight of each of the plurality of first hidden vectors 640 to each of the plurality of first hidden vectors 640. A process of calculating the vector $b_{at}$ may be identified according to Equation 2 below.

$$b_{at,j} = \sum_i a_{j,i} h_i \qquad \text{Equation 2}$$

In Equation 2, i denotes an index of a plurality of words included in the first input text, and j denotes an index of a plurality of words included in the first output text.

According to an embodiment, the output hidden vector $s_t$ (t=0, 1, ..., K) may be a hidden vector used for a process of calculating a plurality of first output vectors 630. The electronic device 200 may determine the output hidden vector $s_t$ by using the vector $b_{at}$ obtained by applying a weight to each of the plurality of first hidden vectors 640, a $(t-1)^{th}$ output hidden vector $s_{t-1}$, and a $(t-1)^{th}$ first output vector $y_{t-1}$. The output hidden vector $s_t$ may be calculated using Equation 3 below.

$$s_t = f_2(s_{t-1}, y_{t-1}, b_{at}) \qquad \text{Equation 3}$$

The output hidden vector $s_0$ may be identical to a second context vector $c_2$ updated based on previous utterances. The function $f_2$ may be computed using various methods.

According to an embodiment, the electronic device 200 may update the second context vector 620 using the plurality of output hidden vectors. A process of updating the second context vector 620 may be identified in Equation 4 below.

$$c_{2u}=f_3(c_{2u-1},s_t), t=1,2,\ldots K \quad \text{Equation 4}$$

According to the disclosure, $c_{2u-1}$ is interpreted as a concept indicating the second context vector 620 before updating, and $c_{2u}$ is interpreted as a concept indicating the second context vector 620 after updating for descriptive convenience. By computing the function $f_3$ using the second context vector $c_{2u-1}$ before updating and the output hidden vector $s_t$, the second context vector $c_{2u}$ after updating may be calculated. The function $f_3$ may be computed using various methods.

According to an embodiment, a relationship of Equation 5 may be established among a $(t-1)^{th}$ first output vector $y_{t-1}$, a $t^{th}$ output hidden vector $s_t$, and a $t^{th}$ first output vector $y_t$, and a plurality of first output vectors 630 $y_1$ to $y_K$ (where K is a natural number) may be determined by using the relationship of Equation 5.

$$y_t=f_4(y_{t-1},s_t), t=1,2,\ldots,K \quad \text{Equation 5}$$

The function $f_4$ may be computed using various methods.

According to an embodiment, the electronic device 200 may determine a plurality of words to be included in a first output text based on the determined plurality of first output vectors 630. A total number of the plurality of first output vectors 630 may be identical to the total number of words to be included in the first output text. The electronic device 200 may select at least one candidate word for each first output vector, and then determine one word corresponding to each first output vector and combine the determined words. The combined words may constitute the first output text.

Figure 7:
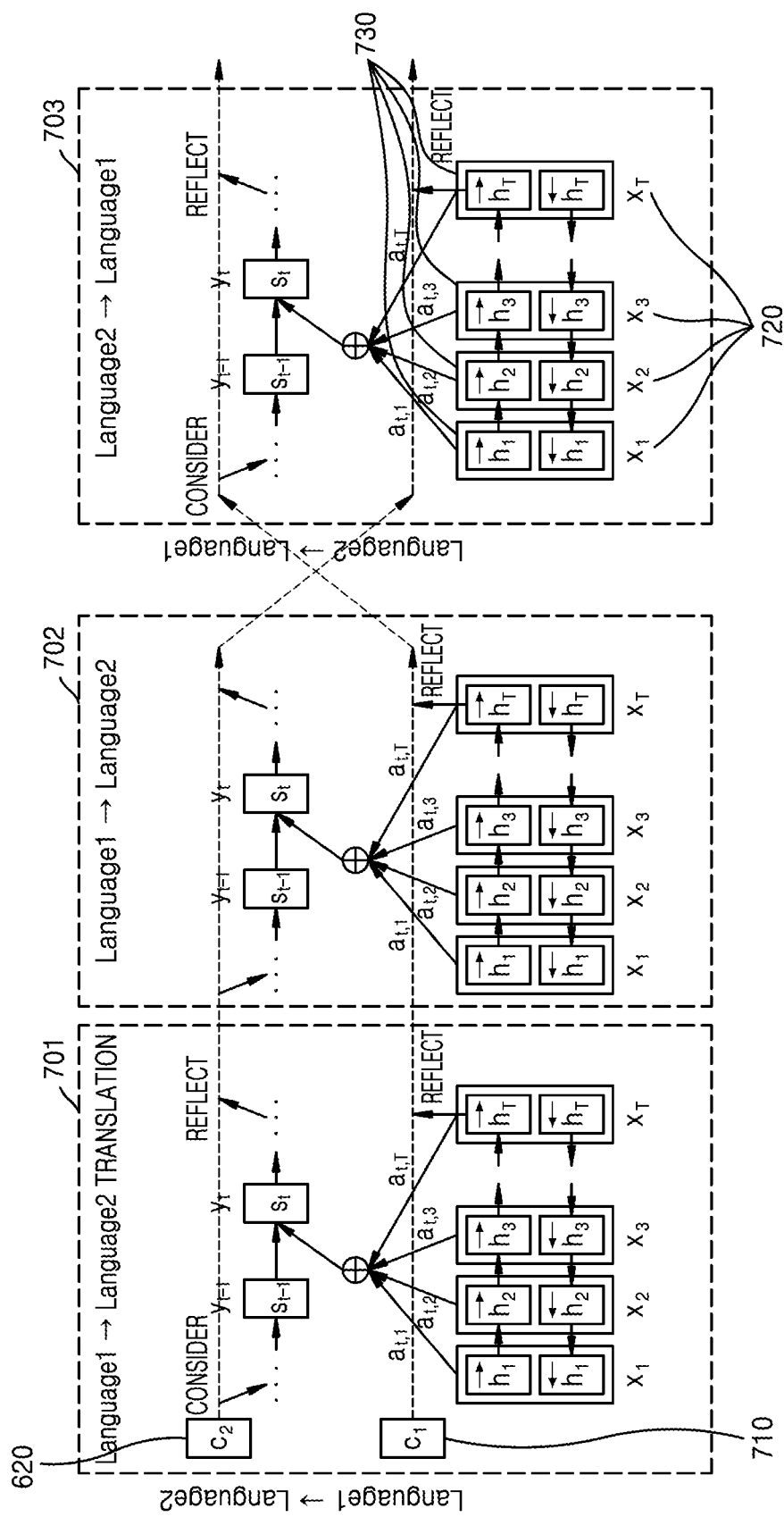
FIG. 7 is a diagram illustrating a process of performing first directional translation and second directional translation, according to an embodiment.

FIG. 7 is a diagram illustrating a process of performing first directional translation and second directional translation according to an embodiment.

A block 702 illustrates a process of translating a first input text in a first language uttered by a first speaker into a first output text in a second language. A block 703 illustrates a process of translating a second input text in the second language uttered by a second speaker into a second output text in the first language. A block 701 illustrates a process of translating an input text in the first language uttered before the first speaker utters the first input text into an output text in the second language. The translation process performed in the block 702 may correspond to the process of performing the first directional translation shown in FIG. 6.

A first context vector 710 illustrated in FIG. 7 is a context vector generated based on a text in the first language. According to an embodiment, the first context vector 710 may be updated based on an input text in the first language. The second context vector 620 may be used in translation processes performed in the blocks 701 and 702 and updated based on an output text in the second language.

According to an embodiment, the electronic device 200 may update the first context vector 710 by using the plurality of first hidden vectors 640. A process of updating the first context vector 710 may be identified using Equation 6 below.

$$c_{1u}=f_5(c_{1u-1},h_1), t=1,2,\ldots,T \quad \text{Equation 6}$$

According to the disclosure, $c_{1u-t}$ is interpreted as a concept indicating a first context vector 710 before updating, and $c_{1u}$ is interpreted as a concept indicating a first context vector 710 after updating for descriptive convenience. By computing the function $f_5$ using a first context vector $c_{1u-1}$ before updating and a first hidden vector $h_t$, a first context vector $c_{1u}$ after updating may be calculated. The function $f_5$ may be computed using various methods.

As shown in the block 702 of FIG. 7, the second context vector 620 used to translate the first input text into the first output text may be updated in translation processes of previous utterances illustrated in FIG. 701.

As illustrated in the block 703, upon obtaining the second input text in the second language uttered by the second speaker, the electronic device 200 may translate the second input text into the second output text in the first language. In other words, the electronic device 200 performs the second directional translation 140 to translate the second input text in the second language uttered by the second speaker 120 into the second output text in the first language.

More particularly, the electronic device 200 may generate a plurality of second input vectors 720 corresponding to the second input text, generate a plurality of second hidden vectors 730 based on the plurality of second input vectors 720, and generate a plurality of second output vectors based on the first context vector 710 and the plurality of second hidden vectors 730. The principle of the second directional translation 140 is the same as that of the first directional translation 130 described above with reference to FIG. 6.

According to an embodiment, the second context vector 620 may be updated based on the input text in the first language. The first context vector 710 may be used in the translation process performed in the block 703 and may be updated based on the output text in the first language.

As described above, according to an embodiment, the electronic device 200 may perform the first directional translation and the second directional translation using the context vector. Accordingly, the electronic device 200 according to an embodiment may reduce a data storage capacity in the electronic device 200 by managing information on the context using the context vector when compared with a method of storing information on a conversation history among speakers in a database DB and using the stored information in case of necessity. Also, a translation method using the electronic device 200 according to an embodiment does not require an additional search operation such as database search, a resource overhead may be prevented.

Meanwhile, when a topic is changed during a conversation, the context vector generated based on previous utterances may deteriorate translation quality rather than improving the translation quality. When the topic of the conversation is changed, the electronic device 200 according to an embodiment may initialize the context vector, thereby solving the above-described problems.

Figure 8:
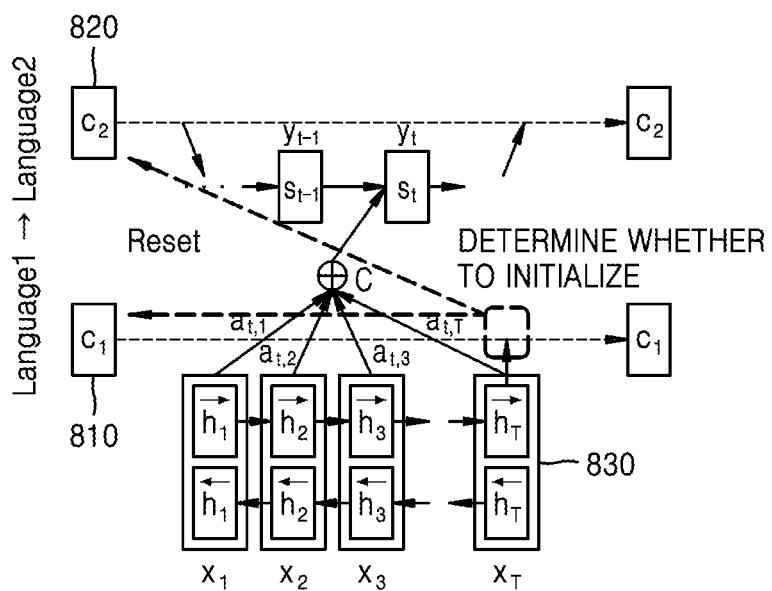
FIG. 8 is a diagram illustrating a process of initializing a context vector, according to an embodiment.

FIG. 8 is a diagram illustrating a process of initializing a context vector according to an embodiment.

According to an embodiment, upon determining that the topic of the uttered language is changed, the electronic device 200 may initialize the context vector. More particularly, upon determining that the topic of the uttered language is changed, the electronic device 200 may initialize a first context vector 810 and a second context vector 820.

According to an embodiment, when a degree of association between at least one of the plurality of first hidden vectors and the first context vector 810 is less than a preset reference value, the electronic device 200 may initialize the first context vector 810 and the second context vector 820. For example, when a first hidden vector $h_T$ 830 is last generated among the plurality of first hidden vectors, and the degree of association between the first hidden vector $h_T$ 830 and the first context vector 810 is less than the preset reference value, the electronic device 200 may initialize the first context vector 810 and the second context vector 820.

In other words, a distance between the last generated vector among the plurality of first hidden vectors 640 and the first context vector 810 is greater than the preset reference value, the electronic device 200 may initialize the first context vector 810 and the second context vector 820. For example, when the first hidden vector $h_T$ 830 is last generated among the plurality of first hidden vectors, and the distance between the first hidden vector $h_T$ 830 and the first context vector 810 is greater than the preset reference value, the electronic device 200 may initialize the first context vector 810 and the second context vector 820. As the distance between the first hidden vector $h_T$ 830 and the first context vector 810 increases, the degree of association between the first hidden vector $h_T$ 830 and the first context vector 810 may decrease.

For example, when the preset reference value is 0.1, and the distance between the first hidden vector $h_T$ 830 among the plurality of first hidden vectors 640 and the first context vector 810 is 0.11, the electronic device 200 may determine that the topic of utterance is changed and initialize the first context vector 810 and the second context vector 820.

Meanwhile, the embodiment is not limited to FIG. 8, the electronic device 200 may also initialize the context vector based on the degree of association between the input vector and the context vector for translation in various directions as illustrated in FIG. 7. For example, referring to the block 703, the electronic device 200 may initialize the first context vector 710 and the second context vector 620 when the degree of association between a second hidden vector $h_T$ among the plurality of second hidden vectors 730 and the second context vector 620 is low.

Thus, as shown in FIG. 7, while the electronic device 200 performs the first directional translation 130 and the second directional translation 140, the electronic device 200 may initialize the first context vector 710 and the second context vector 620 in the case where the degree of association between at least one hidden vector among the plurality of first hidden vectors 640 and the first context vector 710 is less than a preset reference value or the degree of association between the at least one hidden vector among the plurality of second hidden vectors 730 and the second context vector 620 is less than a preset reference value.

As illustrated in FIG. 8, the electronic device 200 according to an embodiment may prevent deterioration of translation accuracy caused by using the context vector updated based on previous utterances by initializing the context vector when the topic of conversation is changed.

Figure 9:
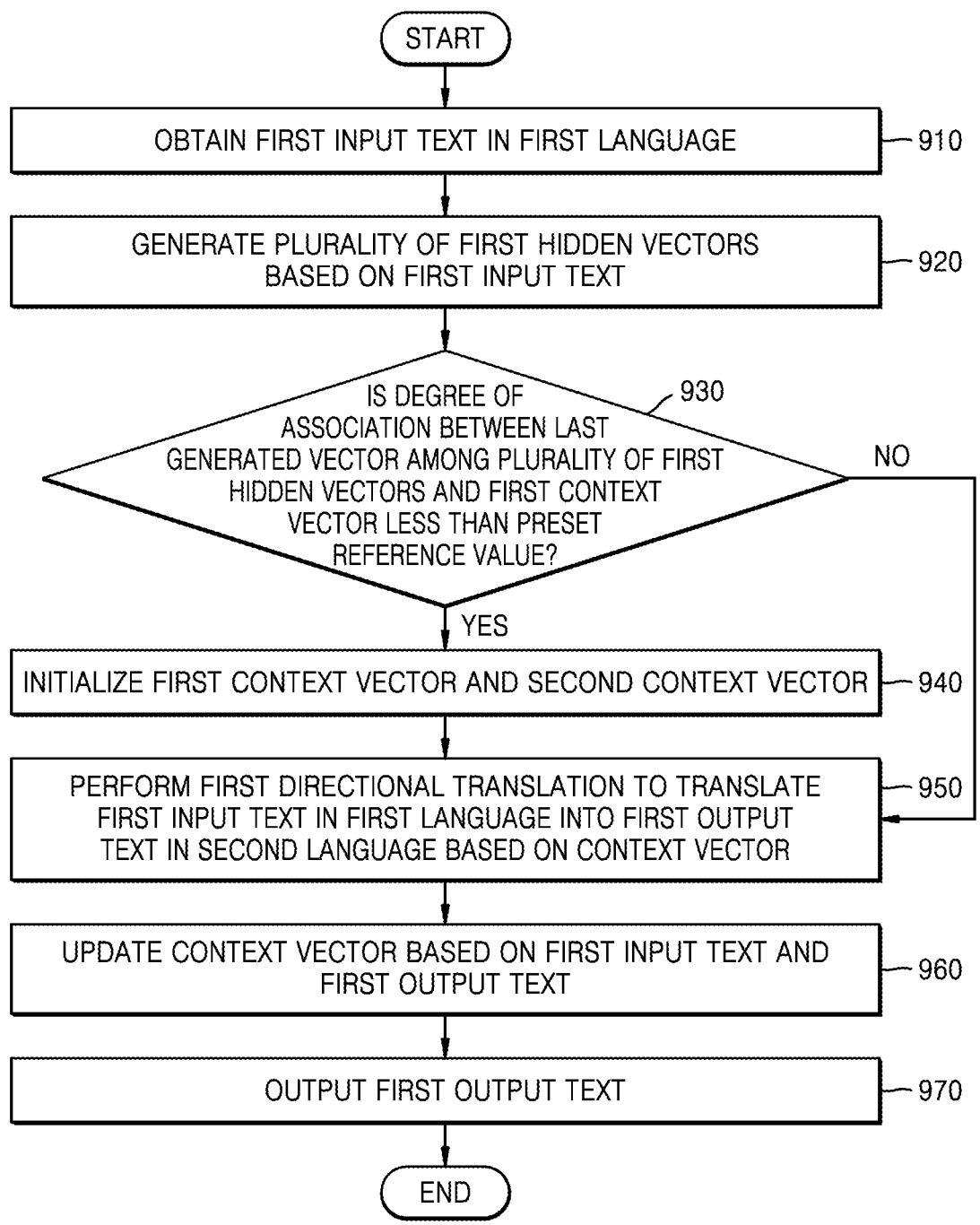
FIG. 9 is a flowchart of a method of updating or initializing a context vector performed by an electronic device, according to an embodiment.

FIG. 9 is a flowchart of a method of updating or initializing a context vector performed by an electronic device according to an embodiment.

Operations 910, 960, and 970 conduct the same operations as those described above with reference to operations 505, 515, and 520 of FIG. 5A, and thus detailed descriptions thereof will be omitted.

In operation 910, the electronic device 200 may obtain the first input text in the first language.

In operation 920, the electronic device 200 may generate the plurality of first hidden vectors 640 based on the first input text.

In operation 930, the electronic device 200 may determine whether the degree of association between the last generated vector among the plurality of first hidden vectors 640 and the first context vector 710 is less than the preset reference value.

Upon determining that the degree of association between the last generated vector among the plurality of first hidden vectors 640 and the first context vector 710 is less than the preset reference value in operation 930, the electronic device 200 may initialize the first context vector 710 and the second context vector 620 in operation 940.

Upon determining that the degree of association between the last generated vector among the plurality of first hidden vectors 640 and the first context vector 710 is the preset reference value or greater in operation 930, the method directly proceeds to operation 950, and the electronic device 200 may perform the first directional translation 130 to translate the first input text in the first language into the first output text in the second language based on the context vector.

In operation 960, the electronic device 200 may update the context vector based on the first input text and the first output text.

In operation 970, the electronic device 200 may output the first output text.

Figure 10:
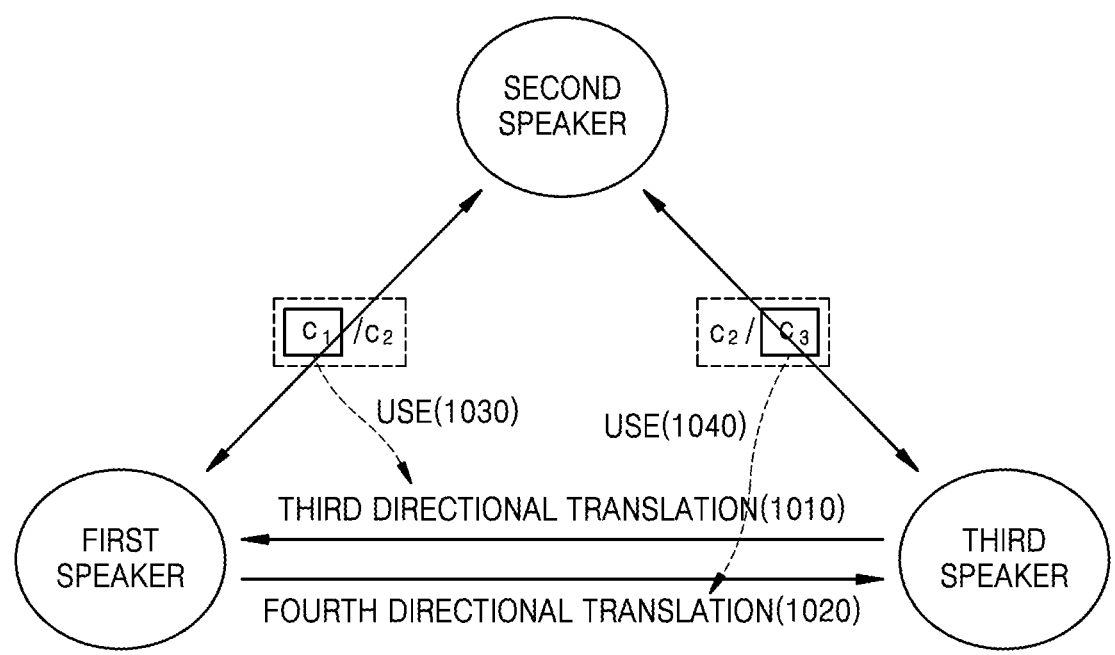
FIG. 10 is a diagram for describing a method of sharing a context vector in a conversation between a plurality of speakers, according to an embodiment.

FIG. 10 is a diagram for describing a method of sharing a context vector in a conversation among a plurality of speakers according to an embodiment.

The electronic device 200 may obtain a first input text in a first language, a second input text in a second language, and a third input text in a third language according to an embodiment.

According to an embodiment, a first context vector $c_1$ may be generated and updated based on an utterance of a first speaker using the first language or a translated text in the first language from an utterance of another speaker using a different language. A second context vector $c_2$ may be generated and updated based on an utterance of a second speaker using the second language or a translated text in the second language from an utterance of another speaker using a different language. A third context vector $c_3$ may be generated or updated based on an utterance of a third speaker using the third language or a translated text in the third language from an utterance of another speaker using a different language.

According to an embodiment, the electronic device 200 may update the first context vector $c_1$ and the second context vector $c_2$ in a process of translating a conversation between the first speaker and the second speaker. More particularly, the electronic device 200 may update the first context vector $c_1$ and the second context vector $c_2$ while performing the first directional translation to translate the content uttered by the first speaker into the second language and the second directional translation to translate the content uttered by the second speaker into the first language.

Also, the electronic device 200 may update the second context vector $c_2$ and the third context vector $c_3$ in a process of translating a conversation between the second speaker and the third speaker. More particularly, the electronic device 200 may update the second context vector $c_2$ and the third context vector $c_3$ while translating the content uttered by the second speaker into the third language and translating the content uttered by the third speaker into the second language.

In addition, the electronic device 200 may update the first context vector $c_1$ and the third context vector $c_3$ in a process of translating a conversation between the first speaker and the third speaker. More particularly, the electronic device 200 may update the first context vector $c_1$ and the third context vector $c_3$ while performing third directional translation (1010) to translate the content uttered by the third speaker into the first language and fourth directional translation (1020) to translate the content uttered by the first speaker into the third language.

According to an embodiment, the electronic device 200 may use at least one of the first context vector $c_1$ and the third context vector $c_3$ updated while translating the conversations between the first speaker and the second speaker and between the second speaker and the third speaker in the case where the third directional translation to translate the content uttered by the third speaker into the first language and the fourth directional translation to translate the content uttered by the first speaker into the third language are performed (1030 and 1040).

More particularly, the electronic device 200 may perform the third directional translation (1010) to translate the third input text in the third language into the third output text in the first language based on the first context vector updated in the conversation between the first speaker and the second speaker.

The electronic device 200 may output the third output text according to an embodiment.

As shown in FIG. 10, one electronic device 200 may perform translation among a plurality of speakers, and the context vector updated while translating conversations of one combination of speakers may be used in conversations of another combination of speakers. Thus, contexts extracted from conversations of various combinations of the speakers may be shared during a translation process, the electronic device 200 may translate conversations among a plurality of speakers more naturally and accurately.

The above description of the disclosure is provided for the purpose of illustration, and it would be understood by those of skill in the art that various changes and modifications may be made without changing technical conception and essential features of the disclosure. Thus, it is clear that the above-described embodiments of the disclosure are illustrative in all aspects and do not limit the disclosure. For example, each component described to be of a single type may be implemented in a distributed manner. Likewise, components described to be distributed may be implemented in a combined manner.

The scope of the disclosure is defined by the following claims and their equivalents rather than by the detailed description of the illustrative embodiments. It shall be understood that all modifications and embodiments conceived from the meaning and scope of the claims and their equivalents are included in the scope of the disclosure.

The invention claimed is:

1. A method of translating an uttered language, the method comprising:
   obtaining a first input text in a first language;
   performing first directional translation to translate the first input text into a first output text in a second language based on a context vector generated by a text obtained before the first input text is obtained, wherein the context vector comprises a first context vector generated based on a text in the first language and a second context vector generated based on a text in the second language, and wherein the performing of the first directional translation comprises performing the first directional translation based on the second context vector;
   updating the context vector based on the first input text and the first output text, wherein the updating of the context vector comprises updating the first context vector based on the first input text and updating the second context vector based on the first output text; and
   outputting the first output text.

2. The method of claim 1, further comprising:
   obtaining a second input text in the second language;
   performing second directional translation to translate the second input text into a second output text in the first language based on the updated context vector;
   reupdating the updated context vector based on the second input text and the second output text; and
   outputting the second output text.

3. The method of claim 1, wherein the first context vector is generated based on at least one of an input text in the first language obtained before the first input text is obtained and an output text in the first language output before the first input text is obtained, and
   the second context vector is generated based on at least one of an input text in the second language obtained before the first input text is obtained and an output text in the second language output before the first input text is obtained.

4. The method of claim 1, wherein the performing of the first directional translation comprises:
   sequentially generating a plurality of first hidden vectors based on a plurality of first input vectors corresponding to a plurality of words included in the first input text in the first language;
   determining respective weights of the plurality of first hidden vectors;
   determining a plurality of first output vectors using the respective weights of the plurality of first hidden vectors, the plurality of first hidden vectors, and the second context vector; and
   determining a plurality of words to be included in the first output text based on the plurality of first output vectors.

5. The method of claim 4, further comprising initializing the first context vector and the second context vector upon determining that a topic of the uttered language is changed.

6. The method of claim 5, wherein the initializing of the first context vector and the second context vector comprises initializing the first context vector and the second context vector when a degree of association between a last generated vector among the plurality of first hidden vectors and the first context vector is less than a preset reference value, or when a degree of association between a last generated vector among a plurality of second hidden vectors and the second context vector is less than a preset reference value.

7. The method of claim 1, wherein the performing of the first directional translation comprises:
   identifying the first language as a type of the uttered language; and
   determining the second language as a target language into which utterances in the first language are to be translated.

8. The method of claim 1, wherein the context vector further comprises a third context vector generated based on a text in a third language, and
   the method further comprises:
   obtaining a third input text in the third language;
   performing third directional translation to translate the third input text in the third language into a third output text in the first language based on the updated first context vector;
   updating the updated first context vector and the third context vector based on the third input text and the third output text respectively; and
   outputting the third output text.

9. The method of claim 1, wherein the first directional translation is performed by using a neural machine translation (NMT).

10. An electronic device for translating an uttered language, the electronic device comprising:
- at least one processor; and
- a memory storing instructions executable by the at least one processor,
- wherein the at least one processor executes the instructions to:
- obtain a first input text in a first language,
- perform first directional translation to translate the first input text into a first output text in a second language based on a context vector generated by a text obtained before the first input text is obtained, wherein the context vector comprises a first context vector generated based on a text in the first language and a second context vector generated based on a text in the second language, and wherein the performing of the first directional translation comprises performing the first directional translation based on the second context vector,
- update the context vector based on the first input text and the first output text, wherein the updating of the context vector comprises updating the first context vector based on the first input text and updating the second context vector based on the first output text, and
- output the first output text.

11. The electronic device of claim 10, wherein the at least one processor executes the instructions to:
- obtain a second input text in the second language,
- perform second directional translation to translate the second input text into a second output text in the first language based on the updated context vector,
- reupdate the updated context vector based on the second input text and the second output text, and
- output the second output text.

12. The electronic device of claim 10, wherein the at least one processor executes the instructions to identify the first language as a type of the uttered language, and determine the second language as a target language into which utterances in the first language are to be translated.

13. A non-transitory computer-readable recording medium having recorded thereon a program for executing the method of claim 1.

* * * * *